No. 720,592. PATENTED FEB. 17, 1903.
M. M. KOHN.
ELECTRIC BATTERY.
APPLICATION FILED JULY 31, 1895.
NO MODEL. 2 SHEETS—SHEET 1.
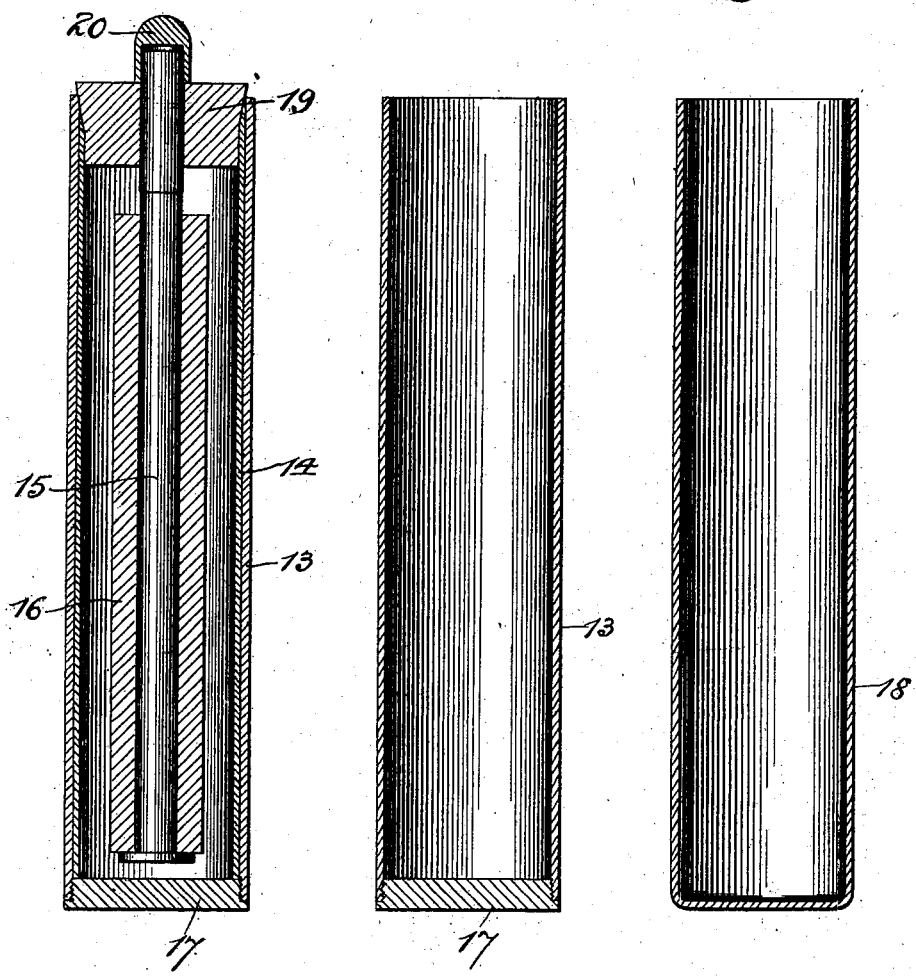
Witnesses
Inventor
Milton M. Kohn

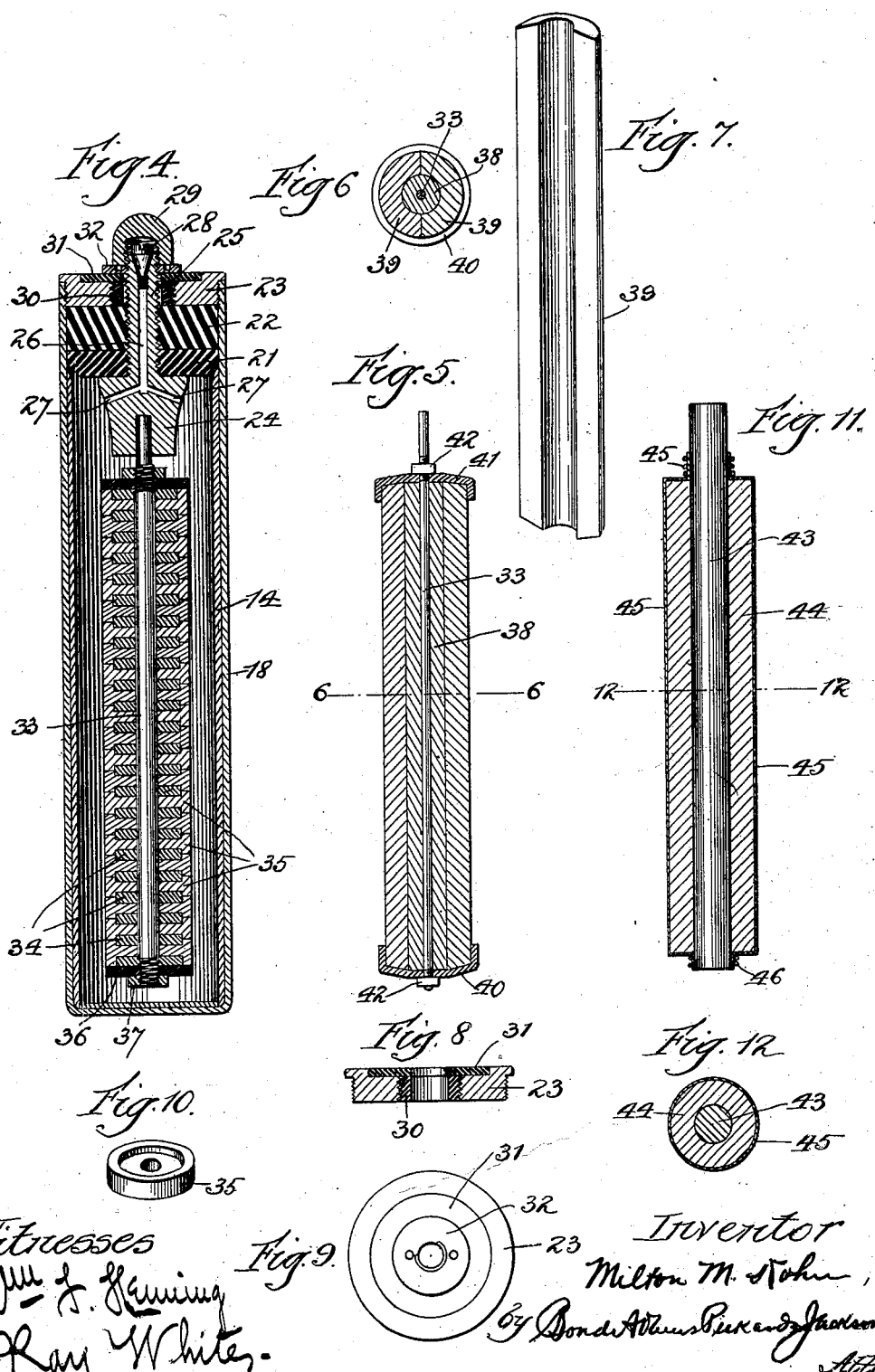

UNITED STATES PATENT OFFICE.

MILTON M. KOHN, OF CHICAGO, ILLINOIS.

ELECTRIC BATTERY.

SPECIFICATION forming part of Letters Patent No. 720,592, dated February 17, 1903.

Application filed July 31, 1895. Serial No. 557,661. (No model.)

*To all whom it may concern:*

Be it known that I, MILTON M. KOHN, a citizen of the United States, residing in Chicago, in the county of Cook and State of Illinois, have invented certain new and useful Improvements in Electric Batteries, of which the following is a specification, reference being had to the accompanying drawings, in which—

Figure 1 is a vertical section of a cell. Fig. 2 is a vertical section of the retaining vessel or shell. Fig. 3 is a similar view showing a modified form of retaining vessel. Fig. 4 is a vertical section showing the preferred form of cell. Fig. 5 is a vertical section of the negative element and the depolarizer. Fig. 6 is a cross-section on line 6 6 of Fig. 5. Fig. 7 is a perspective view of one of the sections of the depolarizer. Fig. 8 is a vertical section of the cap which closes the cell. Fig. 9 is a plan view of the same. Fig. 10 is a perspective view of one of the depolarizer-disks. Fig. 11 is a vertical section of the negative element, showing a modified arrangement of the depolarizer; and Fig. 12 is a cross-section on line 12 12 of Fig. 11.

My invention relates to electric batteries, and particularly to that class commonly known as "dry" batteries.

It has for its object to provide certain improvements in dry batteries, by which a battery will be produced having greater efficiency than any commercial cell heretofore produced, which may be more conveniently handled, which will be longer lived, and which will have various other advantages, as will be hereinafter set forth.

That which I regard as new will be set forth in the claims.

As illustrated in Fig. 1, my improved battery, broadly considered, comprises a retaining vessel 13, of metal or some other good conductor of electricity, a positive element 14 in contact with the interior surface of the retaining vessel, a negative element 15 within the retaining vessel, a depolarizer 16 around said negative element, and a suitable excitant or electrolyte. The retaining vessel 13 is preferably cylindrical in form and is open at one end. If desired, it may be formed of a piece of tubing having a cap 17 secured at one end by screwing or otherwise, or it may be formed of a single piece of metal spun or drawn into shape, as shown at 18 in Fig. 3.

In the simplest form of the battery, as shown in Fig. 1, the negative element, of carbon, is incased in a cylinder 16 of suitable depolarizing material, such as copper oxid mixed with copper chlorid. Other depolarizers, both in solid and liquid form, may, however, be used. An ordinary stopper 19 is inserted in the upper end of the retaining vessel, such stopper being of suitable insulating material. The upper end of the carbon is preferably copper-plated to increase its conductivity, and over its upper end is soldered a cap 20, said cap being in contact with the carbon and serving as a means through which electrical contact may be made with the carbon. It will thus be seen that the positive element, preferably zinc, is in contact with the outer or retaining shell throughout its entire surface and that electrical connection with such positive element may be made by contact with the retaining vessel, thus avoiding the use of binding-screws and other similar devices heretofore commonly used. Another important advantage of this construction is that the life of the battery is greatly increased over the life of the dry batteries heretofore commonly used, in that in such batteries heretofore used the positive element has itself served as the retaining vessel, and as after a short time the excitant would eat through the cell the usefulness of the battery would be destroyed before the mass of the zinc would be consumed. In my improved cell, however, the zinc being inclosed in a retaining vessel the battery is not unfitted for use until practically all the zinc has been consumed. It will be understood that the retaining vessel must be of such material as will not be chemically acted upon readily by the excitant used. The vessel 13 is preferably of brass, the positive lining 14 being of zinc. The preferred electrolyte depends on the negative element employed. If the negative element is oxid of copper, a solution of caustic soda or potash will be employed as the electrolyte. If the negative element consists of carbon or peroxid of manganese, sal-ammoniac solution will be used as the electrolyte. With the negative element composed of a silver compound, chlorid of zinc solution will constitute the electrolyte.

While the form of cell shown in Fig. 1 is one of the simplest, embodying that part of my invention which is above described, I prefer to manufacture cells having the construction shown in Fig. 4, which differs from the other in that the negative element is of superior construction and the cell is hermetically sealed and provided with a valve for relieving the pressure in the cell when it is desired to open it, as will be hereinafter described.

Referring to the form shown in Fig. 4, a retaining vessel 18 is used similar to that shown in Fig. 3. Within the retaining vessel 18 is the positive element 14, of zinc, substantially as shown in Fig. 1. As shown in Fig. 4, the retaining vessel projects a short distance beyond the positive element 14 and is screw-threaded at its upper end. Within the upper end of the retaining vessel, immediately above the positive element, is an insulating-disk 21, fitting snugly into the upper portion of the retaining vessel. Above the insulating-disk 21 is a rubber disk 22, which fits tightly into the retaining vessel. Above the rubber disk is screwed a cap 23, which screws down into and closes the upper end of the retaining vessel.

24 indicates a valve and connector, having a stem 25, which passes through the insulating-disk 21, the rubber disk 22, and the cap 23.

26 27 indicate passages in the valve 24, extending from the interior of the cell to the exterior thereof.

28 indicates a screw or plug which fits into the upper end of the stem 25, closing the passage 26.

29 indicates a cap which is fitted upon the upper end of the stem 25, which is screw-threaded, so that the cap may be screwed down tightly thereupon.

The valve 24 is of suitable conducting material and serves as a conductor of the current from the negative element to the cap 29.

The stem 25 and cap 29 are insulated from the cap 23 by an insulating-ring 30 and an insulating-washer 31.

32 indicates a nut which rests upon the washer 31 immediately under the cap 29. The nut 32 screws upon the stem 25, thereby serving to draw up the valve, causing its lower broad portion to expand the rubber disk 22 laterally as it is compressed between the valve and the cap 23. A tight closure of the cell is thereby effected.

The object of the valve 24 is to permit of the discharge of the gas which is formed by the action of the battery within the cell. After the battery has been working for a short time it causes considerable pressure within the cell, and in order that the cap 23 may be safely removed it is necessary that the pressure should be relieved, which may be done by removing the cap 29 and screw 28.

33 indicates a rod the upper end of which is secured to the valve 24, preferably by being soldered in a suitable recess therein. The rod 33 is of suitable conducting material and has mounted upon it a series of carbon disks 34 and depolarizer-disks 35, arranged alternately, as shown in Fig. 4.

36 indicates an insulating-disk arranged at the lower end of the rod 33 for supporting the various disks 34 35, and 37 indicates a nut, also of insulating material, which is screwed upon the lower end of the rod 33.

As best shown in Figs. 4 and 10, depolarizer-disks 35 are countersunk within their peripheries at opposite sides, the carbon disks 34 resting in the recesses formed. By this construction a much larger proportionate area of depolarizing material is secured, thereby greatly increasing the efficiency of the battery. Furthermore, the thickness of the depolarizing material in a direct line between the carbon disks and the positive element is much less than in any construction heretofore used providing the same proportionate area of depolarizer, the result being that the resistance to the passage of the current to the carbon disks is diminished, further increasing the efficiency of the battery.

The metallic rod 33 serves not only as a support for the carbon and depolarizer disks, but also strengthens the negative element, which is an advantage.

In Figs. 5, 6, and 7 I have illustrated another form of negative element which may be used in my improved cell instead of that last described, although it is not as efficient as the other. In this form instead of using carbon and depolarizer disks a central carbon rod 38 is used, through which passes the metal rod 33. Around the carbon rod is a depolarizer consisting of two sections 39, of depolarizing material. The ends of the element are caps 40 41, which hold the parts in place, being secured by nuts 42 upon the rod 33.

In Figs. 11 and 12 a still further form of negative element is shown, such form consisting of a central carbon rod 43, around which is a cylinder of depolarizing material 44, and inclosing the depolarizing material is a casing 45, of paper or cloth, which is sufficiently porous to prevent crystallization. The ends of the casing are secured by wrapping with twine 46 or other suitable material.

Although the forms of negative elements shown in Figs. 1, 5, and 11 are capable of use in my improved battery, yet they are not as efficient and do not contain many of the advantages derived from the construction shown in Fig. 4, and therefore the latter construction is preferred.

That which I claim as my invention, and desire to secure by Letters Patent, is—

1. In an electric battery, the combination with a retaining vessel, positive and negative elements, and an excitant therein, of means for sealing said retaining vessel, a valve 24 having passages 27 and a threaded passage 26 communicating with the passages 27 and with the atmosphere, and a threaded plug fitted in the upper end of said threaded passage, substantially as described, and for the purpose specified.

2. In an electric battery, the combination with a metallic retaining vessel, positive and negative elements, one of said elements being in contact with said retaining vessel but independent thereof, and an excitant, of means for sealing said retaining vessel to prevent the escape of gas, and a valve for the discharge of the gases generated by the action of the battery, said valve being a conductor and connected to the negative element, substantially as described.

3. In an electric battery, the combination with a retaining vessel, positive and negative elements, and an excitant therein, of a cap 23, packing under said cap, valve 24, which is also a conductor, passing through said cap, and connected to one of the battery elements, a passage through said valve, and means for closing said passage, substantially as described.

4. In an electric battery, the combination with a retaining vessel, positive and negative elements, and an excitant therein, of means for sealing said retaining vessel, a valve 24 connected to the negative element and having passages 26 27, said valve being a conductor, and a plug for closing said passages to prevent the escape of gas, substantially as described.

5. The combination with a cell, positive and negative elements and an excitant therein, a valve which is also a conductor arranged in one end of said cell and connected to one of the battery elements, a packing disposed about said valve within the cell, and means for expanding the packing to hold the valve in place and close the cell, substantially as described.

6. The combination with a cell, positive and negative elements, and an excitant therein, of packing for closing said cell, a cap above said packing, a valve which is also a conductor extending through said packing and connected to the negative element, said valve having a shoulder, and means for compressing the packing between the shouldered portion of the valve-body and said cap, whereby the packing may be expanded, substantially as described.

7. In an electric battery, the combination with a retaining vessel having positive and negative elements, and an excitant therein, of a valve 24 having a screw-threaded stem 25, a passage 26 therein, means for closing said passage, a nut 32 screwed upon said stem, a cap 23 fitted into the retaining vessel, and packing between said valve and said cap, substantially as described.

8. A negative element for electric batteries, consisting of a series of electrically-negative disks and disks of depolarizing material arranged alternately, the electrically-negative disks being entirely inclosed in the disks of depolarizing material and means for supporting said disks, substantially as described.

9. A negative element for electric batteries consisting of a series of electrically-negative disks and disks of depolarizing material arranged alternately and in contact with one another, the electrically-negative disks being entirely inclosed in the disks of depolarizing material and means for supporting said disks, substantially as described.

10. The combination, in a negative electrode, of a series of electronegative disks and disks of depolarizing material, the electronegative disks being entirely inclosed in the disks of depolarizing material and a rod extending through and supporting said disks, substantially as described.

11. As an article of manufacture, a disk of depolarizing material countersunk within its periphery, substantially as described.

12. As an article of manufacture, a disk of depolarizing material countersunk within its periphery upon its opposite sides, substantially as described.

13. A negative element for electric batteries, consisting of a series of disks of depolarizing material countersunk within their peripheries upon their opposite sides and superimposed one upon another, and electrically-negative disks seated in said countersunk disks, substantially as described.

14. In an electric battery, the combination with a cell, positive and negative elements, and an excitant therein, of means for hermetically sealing said cell, and a valve connected to one of the elements of the battery for permitting the escape of gas from said cell, said valve being a conductor substantially as described.

15. In an electric battery, the combination with a metallic cell, positive and negative elements therein, one of said elements being in contact with said cell, and an excitant in said cell, of means for hermetically sealing said cell, and a metallic valve for the escape of gas therefrom, said valve forming one of the poles of the battery, substantially as described.

MILTON M. KOHN.

Witnesses:
JOHN L. JACKSON,
A. H. ADAMS.